United States Patent
Babian

(10) Patent No.: US 7,658,357 B2
(45) Date of Patent: Feb. 9, 2010

(54) AUTOMOTIVE CONSOLE MOUNTING BRACKET

(75) Inventor: Philip Joseph Babian, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 130 days.

(21) Appl. No.: 11/347,118

(22) Filed: Feb. 3, 2006

(65) Prior Publication Data

US 2007/0181763 A1    Aug. 9, 2007

(51) Int. Cl.
*A47F 5/00*    (2006.01)

(52) U.S. Cl. ............... 248/309.1; 248/300; 248/220.21; 248/176.1; 296/37.8; 296/24.34

(58) Field of Classification Search ............... 248/300, 248/220.21, 220.22, 176.1, 309.1; 224/926, 224/483; 296/37.8, 37.14, 37.7, 37.12, 24.1, 296/70, 24.34, 37, 14
See application file for complete search history.

(56) References Cited

U.S. PATENT DOCUMENTS

| D32,493 | S |   | 4/1900 | Hartshorn |
| 1,303,391 | A | * | 5/1919 | Reich ........................ 248/672 |
| 1,704,883 | A |   | 3/1929 | Cullinan |
| 3,088,620 | A |   | 5/1963 | Crawford |
| 3,600,016 | A |   | 8/1971 | Dilley |
| D244,830 | S |   | 6/1977 | Tulak |
| 4,317,582 | A | * | 3/1982 | Cottin et al. ................. 280/751 |
| 4,545,467 | A |   | 10/1985 | Fernandez et al. |
| 5,106,143 | A |   | 4/1992 | Soeters |
| 5,230,495 | A | * | 7/1993 | Brackus ....................... 248/300 |
| 5,676,216 | A | * | 10/1997 | Palma et al. .................... 180/90 |
| 6,324,810 | B1 |   | 12/2001 | Thompson |
| 6,428,072 | B1 | * | 8/2002 | Moore ...................... 296/24.34 |
| 6,648,402 | B2 | * | 11/2003 | Scheib et al. .......... 296/203.02 |
| 6,843,521 | B1 | * | 1/2005 | Oana ............................ 296/70 |
| 7,401,830 | B2 | * | 7/2008 | Akimoto et al. .......... 296/24.34 |
| 7,513,550 | B1 | * | 4/2009 | Abro et al. ................ 296/24.34 |
| 2005/0006545 | A1 |   | 1/2005 | Barriault et al. |
| 2005/0015960 | A1 |   | 1/2005 | Goetz et al. |

FOREIGN PATENT DOCUMENTS

| JP | 58-194641 | 11/1983 |
| JP | 11-180220 | 7/1999 |

* cited by examiner

*Primary Examiner*—J. Allen Shriver
*Assistant Examiner*—Todd M. Epps
(74) *Attorney, Agent, or Firm*—Gifford, Krass, Sprinkle, Anderson & Citkowski, P.C.

(57) ABSTRACT

A mounting bracket for an automotive console of an automotive vehicle having at least one sidewall which extends upwardly from the floor of a vehicle. The mounting bracket includes a base adapted for connection to the floor of the vehicle. A central leg extends upwardly from the base and has a top attached to its upper end. The top includes a portion which lies in a substantially horizontal plane and is adapted for connection to the console. In addition, a side flange is attached to and extends outwardly from the top and abuts against the console sidewall to provide additional lateral support. The mounting bracket is of a one-piece construction.

14 Claims, 2 Drawing Sheets

AUTOMOTIVE CONSOLE MOUNTING BRACKET

BACKGROUND OF THE INVENTION

I. Field of the Invention

The present invention relates generally to a bracket for mounting an automotive console to an automotive vehicle.

II. Description of Related Art

Many modern automotive vehicles include a console which extends upwardly between the driver and passenger seat of the automotive vehicle. The console typically includes various operating switches as well as storage compartments for the vehicle occupants.

In order to attach the automotive console to the vehicle, one or more mounting brackets extend between the vehicle floor and the console. These mounting brackets are secured both to the vehicle floor as well as to the console by fasteners in order to secure the console to the vehicle floor and thus to the automotive vehicle. Typically, the fastener which mounts the bracket to the console extends through a top surface of the console, typically within a storage compartment.

While these previously known mounting brackets have worked adequately for attaching the console to the vehicle where the automotive console protrudes only a relatively short distance above the vehicle floor, such mounting brackets provide inadequate support for taller consoles of the type used in some automotive vehicles. In particular, these previously known brackets have provided inadequate support for lateral forces imposed upon the console.

In order to provide adequate support between the console and the vehicle for the relatively tall automotive consoles, the previously known automotive consoles have included portions with increased wall thickness at the point of contact between the mounting bracket and the console. This, however, disadvantageously increases the manufacturing and material costs for the console.

A still further solution for mounting tall automotive consoles to the vehicle floor and for adequately providing support for the consoles against lateral forces has been to add additional brackets in between the console and the vehicle. This, however, disadvantageously increases the cost of the vehicle by not only the cost of the bracket itself, but also the installation cost for the bracket. Such additional brackets also disadvantageously increase the overall weight of the vehicle.

SUMMARY OF THE PRESENT INVENTION

The present invention provides a mounting bracket for an automotive vehicle for mounting a console having at least one sidewall, and which extends upwardly from the floor of the vehicle.

In brief, the mounting bracket of the present invention includes a base which is adapted for connection to the floor of the vehicle. A central leg extends upwardly from the base and has an upper end positioned above the vehicle floor.

A top is attached to an upper end of the central leg and this top has a portion which lies in substantially a horizontal plane. A fastener opening is provided through the top for attaching the console to the bracket top with a fastener.

A side flange is also attached to the top. This side flange includes a portion which lies in substantially a vertical plane and is adapted to abut against the console sidewall. Consequently, when the top is secured to the console by the fasteners, the abutment of the side flange against the console sidewall supports the console sidewall against lateral forces and impacts.

Preferably, the flange is of a one-piece metal construction. Furthermore, the base, central leg, top and side flange preferably each include a planar midsection and a supporting rib along each side to rigidify the mounting bracket.

In practice, the base of the mounting bracket is attached to the vehicle floor by conventional fasteners in the conventional fashion. In doing so, the central leg protrudes upwardly from the vehicle floor by a predetermined amount and maintains the bracket top in a substantially horizontal plane.

The console is then positioned over the bracket. In doing so, the bracket top abuts against an upper wall of the console and a fastener is then used to secure the upper wall of the console to the bracket top. Simultaneously, the side flange abuts against the sidewall of the console thus supporting the console against lateral forces and impacts.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
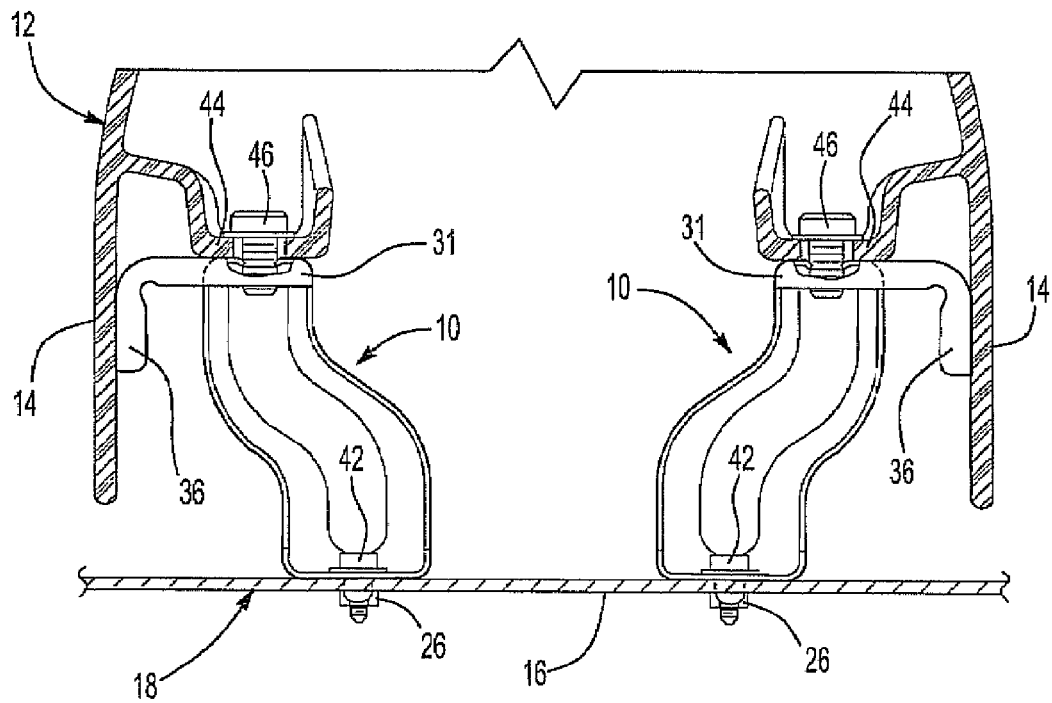
FIG. 1 is a partial sectional view illustrating a preferred embodiment of the present invention used to secure an automotive console to an automotive vehicle floor.

With reference first to FIG. 1, a preferred embodiment of a mounting bracket 10 is shown for securing a console 12 having sidewalls 14 to a floor 16 of an automotive vehicle 18 (only partially illustrated). As illustrated in FIG. 1, a pair of brackets 10 are illustrated for securing the console 12 to the vehicle floor 16. However, these brackets 10 are either identical to each other, or mirror images of each other. Therefore, only a single bracket 10 will be described in detail, it being understood that a like description shall also apply to the second bracket 10.

Figure 2:
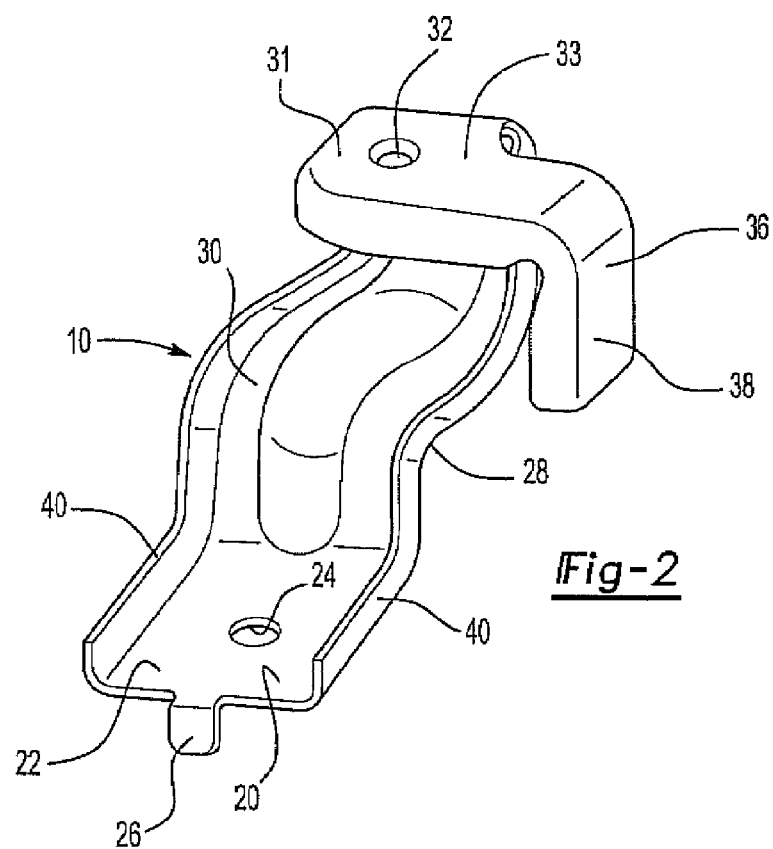
FIG. 2 is an elevational view of the preferred embodiment of the invention.
Figure 3:
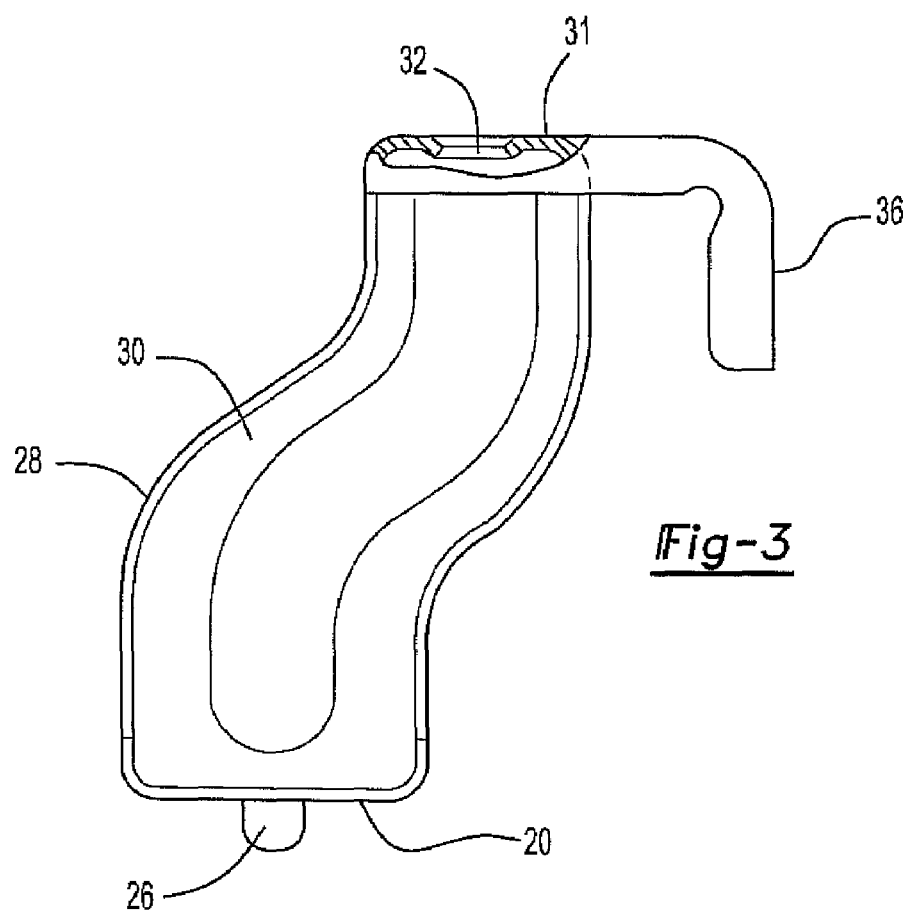
FIG. 3 is a front view of the preferred embodiment of the present invention.

With reference now to FIGS. 2 and 3, the bracket 10 is there shown in greater detail and comprises a base 20 having a generally planar midsection 22 and a fastener opening 24 formed through the planar midsection 22. Additionally, a locating tab 26 protrudes downwardly from the base 20. As shown in FIG. 1, this locating tab 26 extends through an opening in the vehicle floor 16 for positioning the bracket 10 on the vehicle floor 16 in preparation for mounting the console 12.

Still referring to FIGS. 2 and 3, a central leg 28 extends upwardly from the base 20 by a predetermined amount. This central leg 28 also includes a generally planar midsection 30 and may include an aperture 32 formed through it to reduce the overall weight of the mounting bracket 10.

A top 31 extends outwardly from the upper end of the central leg 28. This top 31, furthermore, has a planar midsection 33 which lies in a substantially horizontal plane, i.e. the same as the plane of the vehicle floor 16, and has a fastener opening 32 formed through it. The top 31 also overlies a portion of the central leg 28 thus providing a compact design for the bracket 10.

Figure 4:
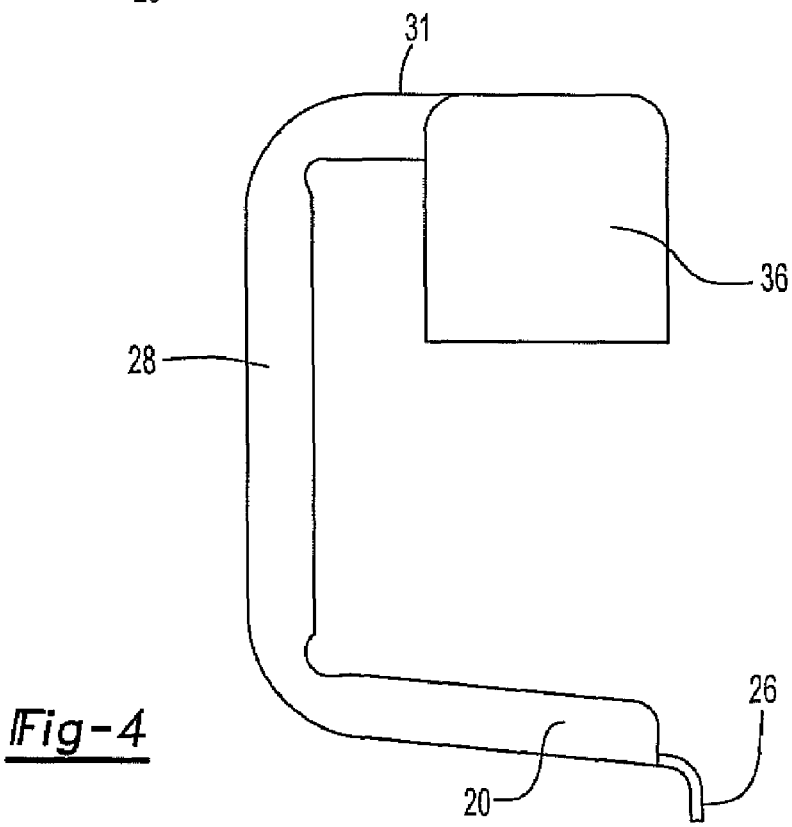
FIG. 4 is a side view of the preferred embodiment of the mounting bracket of the present invention.

Still referring to FIGS. 2-4, the mounting bracket 10 further includes a side flange 36 attached to and extending outwardly from the top 31. This side flange 36 includes a planar midsection 38 which lies in substantially a vertical plane parallel to the plane of the console sidewall 14.

The entire mounting bracket 10 is preferably of a one-piece metal construction. Furthermore, the entire bracket is preferably formed from relatively flat metal bar stock that is bent as required to form the base, central leg, top and side flange. A strengthening rib 40 is also preferably provided along at least one, and preferably both sides of the bracket 10 to further rigidify the bracket 10.

With reference now particularly to FIG. 1, the brackets are positioned within the vehicle so that the locating tabs 26 are positioned through their respective locating holes in the vehicle floor 16 and so that the base 20 flatly abuts against the floor 16. The base 20 is then secured to the vehicle floor 16 by appropriate fasteners 42.

With the base secured to the vehicle floor, the bracket top 31 lies in a generally horizontal plane at a position spaced upwardly from the vehicle floor 16. The console 12 is then positioned over the bracket 10 so that an upper wall 44 of the console 12 flatly abuts against the bracket top 31.

With the console 12 positioned over the bracket 10, the bracket side flange 36 flatly abuts against the inside of the console sidewall 14 at a position spaced upwardly from the vehicle floor 16. Thus, when the console sidewall 14 is secured to the bracket top 31 by a fastener 46, the bracket 10 secures the console 12 to the vehicle 18 against not only vertical forces, but simultaneously supports the console 12 against lateral forces due to the abutment of the side flanges 36 with the console sidewalls 14.

From the foregoing, it can be seen that the present invention provides a simple, inexpensive and yet totally effective mounting bracket for an automotive console which overcomes all of the above-mentioned disadvantages of the previously known devices.

Having described my invention, however, many modifications thereto will become apparent to those skilled in the art to which it pertains without deviation from the spirit of the invention as defined by the scope of the appended claims.

I claim:

1. A mounting bracket for an automotive console positioned between adjacent seats of an automotive vehicle, said console having at least one sidewall which extends upwardly from a floor of the vehicle, said mounting bracket comprising:
   a base adapted for connection to the floor of the vehicle,
   a central leg which extends upwardly from said base, said central leg having a vertically extending lower portion, a vertically extending upper portion and a curved middle portion which connects said lower portion of said central leg to said upper portion of said central leg, said middle portion of said central leg extending in a transverse plane so that said upper portion of said central leg is offset from said lower portion of said central leg,
   a top attached at one end to an upper end of said upper portion of said central leg, said top having a portion which lies in substantially a horizontal plane and is spaced from and overlies a portion of said middle portion of said central leg, said top adapted for connection to the console, and
   a side flange attached to a second end of said top so that said top is positioned in between said side flange and said central leg, said side flange adapted to abut against the console sidewall.

2. The invention as defined in claim 1 wherein said base, central leg, top and side flange are of a one-piece construction.

3. The invention as defined in claim 2 wherein said base, central leg, top and side flange are made of metal.

4. The invention as defined in claim 1 and comprising a hole in said lop adapted to receive a fastener.

5. The invention as defined in claim 1 wherein said base, central leg, top and side flange each comprises a planar midsection and a strengthening rib along at least one side.

6. The invention as defined in claim 5 and comprising a strengthening rib along each side.

7. The invention as defined in claim 1 and comprising a locating tab extending outwardly from said base and adapted to be positioned into a locating hole in the floor.

8. A mounting bracket for an automotive console positioned between adjacent seats of an automotive vehicle, said console having at least one sidewall which extends upwardly from a floor of the vehicle, said mounting bracket comprising:
   a base having a planar midsection and adapted for connection to the floor of the vehicle,
   a central leg having a planar midsection which extends upwardly from one end of said base, said central leg having a vertically extending lower portion, a vertically extending upper portion and a curved middle portion which connects said lower portion of said central leg to said upper portion of said central leg, said middle portion of said central leg extending in a transverse plane so that said upper portion of said central leg is offset from said lower portion of said central leg,
   a top attached at a first end to an upper end of said upper portion of said central leg, said top having a planar portion which lies in substantially a horizontal plane and is spaced from and overlies a portion of said middle portion of said central leg, said top adapted for connection to the console, and
   a side flange having a planar midsection lying in a substantially vertical plane attached at a first end to a second end of said top so that said top is positioned in between said side flange and said central leg, said side flange adapted to abut against the console sidewall.

9. The invention as defined in claim 8 wherein said base, central leg, top and side flange are of a one-piece construction.

10. The invention as defined in claim 9 wherein said base, central leg, top and side flange are made of metal.

11. The invention as defined in claim 8 and comprising a hole in said top adapted to receive a fastener.

12. The invention as defined in claim 8 wherein said base, central leg, top and side flange each comprises a strengthening rib along at least one side of said planar midsections.

13. The invention as defined in claim 12 and comprising a strengthening rib along each side.

14. The invention as defined in claim 8 and comprising a locating tab extending outwardly from said base and adapted to be positioned into a locating hole in the floor.

* * * * *